INVENTORS R. L. BATDORF
C. A. LEE
BY Sylvan Sherman
ATTORNEY

United States Patent Office 3,466,441
Patented Sept. 9, 1969

3,466,441
SEMICONDUCTOR INFRARED-TO-VISIBLE LIGHT IMAGE CONVERTER

Robert L. Batdorf, Reading, Pa., and Charles A. Lee, New Providence, N.J., assignors to Bell Telephone Laboratories, Incorporated, Murray Hill, Berkeley Heights, N.J., a corporation of New York Filed Apr. 7, 1967, Ser. No. 629,196
Int. Cl. H01j 39/00, 31/50
U.S. Cl. 250—83.3 14 Claims

ABSTRACT OF THE DISCLOSURE

The invention described is an infrared-to-visible light image converter which utilizes a p-n junction diode biased just below avalanche breakdown.

An image of infrared radiation is focused onto a surface of the diode. As photons are absorbed, electron-hole pairs are formed, releasing electrons (or holes) which enter into the avalanche region of the diode where they generate secondary electrons and holes. These, in turn, are accelerated, giving rise to energetic collisions with charged impurities present in the lattice, resulting in the emission of visible light.

Because of the high index of refraction of the diode material, the incident infrared radiation and, hence, the emitted light are confined to well defined regions within the diode, resulting in a high resolution image converter.

This invention relates to junction diode image converters.

Background of the invention

One of the limitations of conventional tube-type image converters is their inability to respond to radiation over a broad frequency spectrum. For example, in the infrared region of the spectrum (which includes wavelengths between 0.76 and several thousand microns), the conventional electron tube converter does not respond to radiation of wavelength much longer than 1.3 microns. This is because the sensing element of a tube converter is a photo-emitting material, and it appears to be difficult to obtain materials that emit electrons at the lower frequencies.

In the copending application by R. Kompfner, Ser. No. 581,565, filed Sept. 23, 1966, an image converter is described which uses a simple absorbing material in conjunction with a Schlieren optical system. The present invention is an alternative arrangement which utilizes p-n junction diodes which, by the selection of materials, can be made to operate over any desired portion of the frequency spectrum. The p-n diodes are known to be inexpensive, physically small and highly reliable. As such, image converters constructed in the manner to be described hereinbelow, would increase the flexibility, and significantly broaden the base of this area of technology.

Summary of the invention

An image converter, in accordance with the invention, comprises a p-n junction diode biased to just below avalanche breakdown. So biased, a very high field region, of the order of several hundred kilovolts per centimeter, is produced in the diode.

Upon exposure to infrared radiation electron-hole pairs are formed. In one embodiment the holes move towards the back contact of the diode while the electrons enter the avalanche region where they generate secondary electrons. These, in turn, are also accelerated, giving rise to energetic collisions with charged impurities present in the lattice, resulting in the emission of visible light. Means are provided for viewing the resulting image which is a reproduction of the invisible infrared image originally focused upon the diode.

These and other objects and advantages, the nature of the present invention, and its various features, will appear more fully upon consideration of the various illustrative embodiments now to be described in detail in connection with the accompanying drawings.

Detailed description

Figure 1:
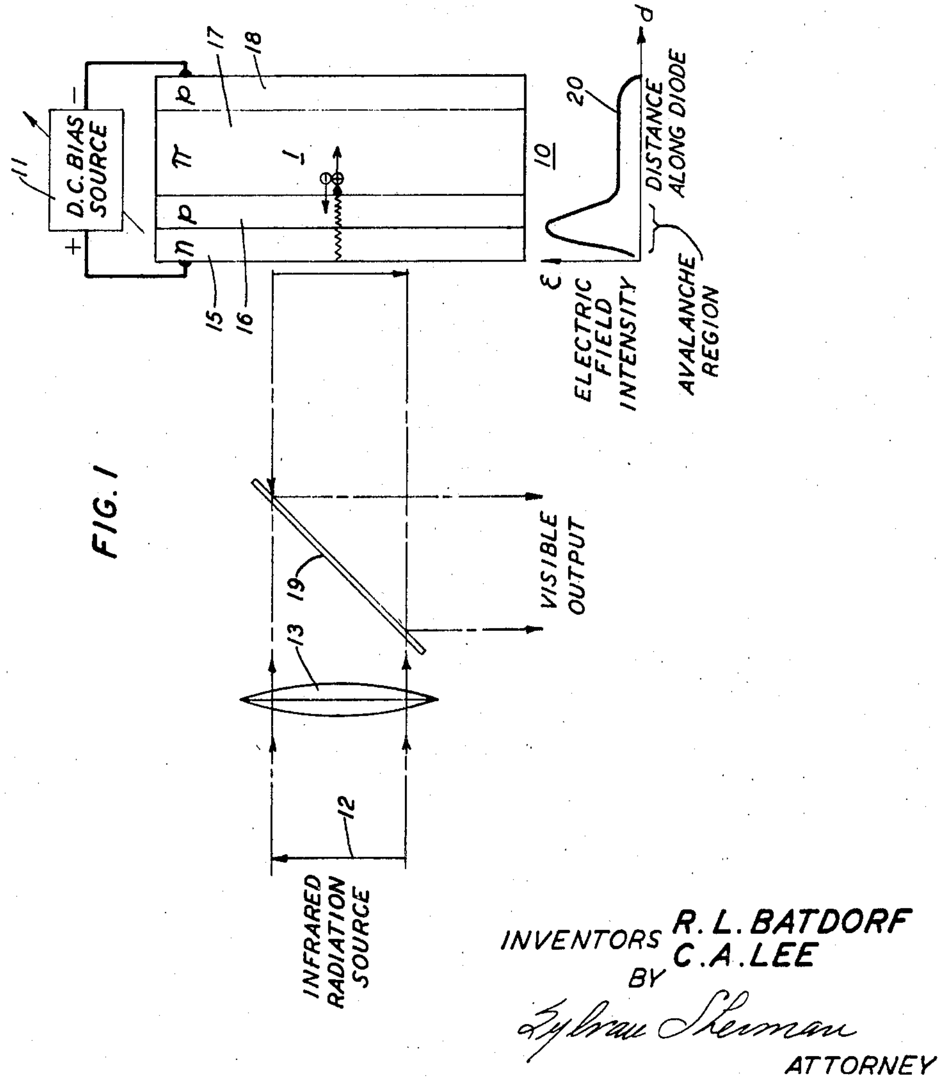
FIG. 1 shows the essentials of an image converter in accordance with the invention.

Referring to the drawings, FIG. 1 shows the essentials of an image converter, in accordance with the invention, comprising a p-n junction diode 10, means 11 for back-biasing the diode, a source 12 of infrared radiation, optical means 13 for focusing the infrared radiation upon diode 10, and means 19 for viewing the resulting visible radiation produced.

Diode 10 comprises a semiconductor material which includes a p-n junction separating an n-type region 15 from a p-type region 16. The diode also includes a $\pi$-type region 17, and a second p-type region 18. Typically, the impurity concentration in the p and n regions is of the order of $10^{15}$ to $10^{17}$ parts per cubic centimeter. The impurity concentration of the $\pi$ region is between $10^{12}$ to $10^{14}$ parts per $cm.^3$. An adjustable D.C. bias source 11 is in ohmic contact with the upper and lower surfaces of diode 10, thus providing a means for back-biasing the junction.

As is known, when a p-n junction device is back-biased, a depletion region is formed wherein the mobile charge carriers, that are normally present in the unbiased condition, are swept out. If additional back-bias is applied across the junction, a level of bias is reached beyond which the reverse current through the diode increases rapidly. This level of back-bias is referred to as the avalanche breakdown voltage. In accordance with the present invention, the back-bias applied to diode 10 is always close to, but less than, the voltage required to produce avalanche breakdown for reasons which will become apparent.

When reverse-biased in this manner, an electric field distribution of the type shown by curve 20 is produced in the diode. Typically, the electric field intensity increases from zero at the upper diode surface to a maximum value in the region of the junction, after which it decreases to some lower level over the $\pi$ region and finally reduces to zero again in the second p region. The value of the electric field in the high field region, referred to as the avalanche region, is of the order of several hundred kilovolts per cm. to half a million volts per cm. The field over the $\pi$ region is typically of the order of 20 kilovolts per cm.

In operation, infrared radiation from an infrared radiating source 12, represented by an arrow is focused upon the front surface of diode 10 by suitable means represented by a lens 13.

When a photon of infrared radiation is absorbed in the semiconductor, an electron-hole pair 1 is formed. The hole ⊕ moves away from the junction towards the back surface of the diode which is connected to the negative terminal of bias source 11. The electron ⊖, on the other hand, moves towards the front surface of the diode which is connected to the positive terminal of bias source 11. Upon entering the avalanche region, the electron is accelerated and strikes other atoms, thereby creating more electron-hole pairs and more high energy electrons and holes. This chain reaction, or avalanching effect, results in a high order of electron-hole multiplication which can be varied by adjusting the bias across the diode. For this reason the back-bias is, advantageously, as large as possible. However, the order of multiplication is limited by the saturation current (thermally generated carriers) which is also multiplied.

The high energy electrons and holes produced in the avalanche region give rise to energetic collisions with charged impurities present in the semiconductor lattice. A significant fraction of these collisions simultaneously emit photons in the visible portion of the spectrum. The wavelength range of this Bremsstrahlung radiation extends from that characteristic of the band gap energy to several times the band gap energy.

The visible radiation emitted by the diode can then be viewed by locating suitable means 19 such as a dichroic beam splitter, in front of the diode. The beam splitter is made to reflect visible radiation while transmitting infrared radiation. Alternatively, the infrared radiation can be focused upon one side of the diode, and the emitted radiation viewed at the other side of the diode, thus forming a "through" image converter. In this alternative arrangement, beam splitter 19 can be omitted.

Figure 2:
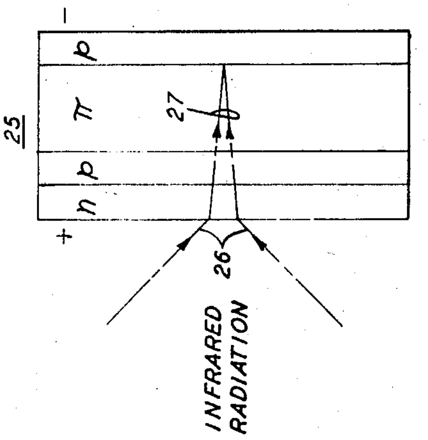
FIG. 2 shows the effect of a high index of refraction upon the cone angle of the incident radiation.

Because of the relatively high index of refraction of the semiconductor material, the resolution of a junction diode image converter is excellent. The reason for this is illustrated in FIG. 2, which shows a p-n junction diode 25 and a broad angle cone of infrared radiation 26 focused thereupon. As illustrated, a large cone angle of as much as 60 degrees, which is characteristic of optical systems with high numerical aperture, can be tolerated since, upon entering the semiconductor material, the cone angle is reduced by a factor approximately equal to the index of refraction of the material. Thus, the cone angle 27 of the radiation within the material is much less, and the depth of focus of the image can be maintained throughout a relatively long absorption region, as is necessary for good resolution and high sensitivity.

The simple embodiment of the invention shown in FIG. 1 is intended primarily to illustrate the mode of operation of the invention. Various modifications in this simple structure can be advantageously made to improve the efficiency and quality of such devices. These modifications relate to both the choice of the semiconductor materials used and to the structural details of the diode. For example, the materials and structure are advantageously selected so as to provide a long infrared absorption region while, at the same time, minimizing the absorption of the visible radiation generated within the diode. In addition, the diode structure is advantageously made so as to produce a relatively broad avalanche region. This has the effect of generating a more uniform light output over the entire surface of the diode.

Figures 3, 4, 5:
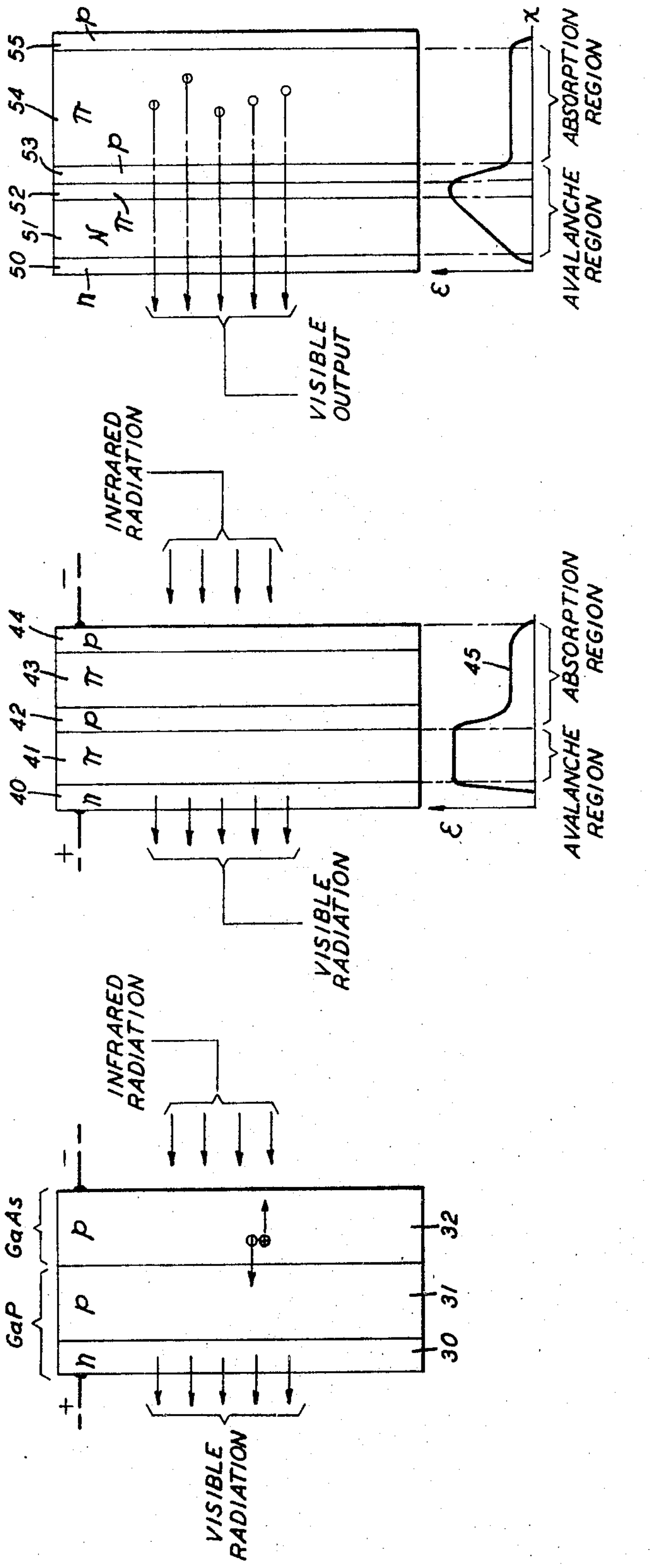
FIG. 3 shows a second embodiment of the invention using a combination of materials.
FIG. 4 shows an arrangement for enlarging the avalanche region.
FIG. 5 shows an arrangement for tapering the avalanche region.

With respect to the semiconductor material, radiant energy is absorbed when the photon energy is greater than the band gap of the material. Thus, a p–n junction diode made of silicon, with a band gap of 1.1 electron volts, would absorb both the infrared radiation and the generated visible light. In such an embodiment, the avalanche region is advantageously located close to the surface of the diode in order to minimize the absorption of the visible image. Preferably, the avalanche region would be formed in a first material, that has a higher band gap and, hence, is transparent to the visible light, while the absorption of the infrared signal is caused to occur in a second material having a lower band gap. Such an arrangement is illustrated in FIG. 3, which includes a first region 30 of n-type gallium phosphide, a second region 31 of p-type gallium phosphide, and a third region 32 of p-type gallium arsenide. The gallium phosphide, which has a band gap of 2.3 electron volts is transparent to radiation up to, and including, green light. The gallium arsenide, on the other hand, has a band gap of 1.2 electron volts, and as such absorbs in the infrared region. In operation, the infrared radiation is advantageously projected onto the gallium arsenide end of the diode, where it is absorbed, producing electron-hole pairs. The electrons move into the gallium phosphide avalanche region where they are accelerated and caused to produce visible radiation which is then efficiently radiated out of the other end of the diode.

FIG. 4 is illustrative of the manner in which the diode structure can be modified to expand the avalanche region. In this embodiment there is a region 40 of n-type material, a first region 41 of lightly-doped p-type material, designated a $\pi$ region, a first region 42 of p-type material, a second $\pi$ region 43 of lightly-doped p-type material, and a second region 44 of p-type material. The carrier concentration in the n-type and p-type regions is typically of the order of $10^{15}$–$10^{17}$ carriers per cubic centimeter, whereas the concentration in the $\pi$ regions is of the order of $10^{12}$–$10^{14}$ carriers per cubic centimeter.

For this type structure, the avalanche region extends essentially over the entire first $\pi$-region 41, as indicated by curve 45. By the suitable selection of materials, absorption is made to take place in the second $\pi$-region 43.

Thus far, only those factors relating to the intensity and uniformity of the output light have been considered. However, other characteristics of the device may be of importance, depending upon the application at hand. For example, where it is anticipated that the image intensity or image location is to change rapidly, the time delay between the absorption of the incident radiation and the generation of visible light may have to be considered. The time response of an avalanche region in a semiconductor with different hole and electron ionization rates has been found to depend on the the shape of the electric field distribution and the carrier type (i.e., hole or electron) that initiates the avalanche process. It is thus advantageous as a means of optimizing the time response of the converter to shape the electric field distribution and to use the carrier with the highest ionization rate to excite the avalanche. This can be done, for example, by the arrangement of the p-type and the n-type regions and by controlling the carrier concentrations in the respective regions.

FIG. 5 is an example of an image converter, in accordance with the invention, in which an asymmetrical avalanche region is formed in a structure utilizing electron avalanching. The converter comprises, in order, an n-type region 50, a $\nu$-type region 51 of intermediate constant or gradually decreasing donor concentration, a first $\pi$-type region 52 of uniform acceptor concentration, a first p-type region 53, a second $\pi$-type region 54, and a second p-type region 55. By adjusting the donor concentration in region 51, an asymmetric avalanche region of optimal response time, as shown by curve 56, can be produced.

Figure 6:
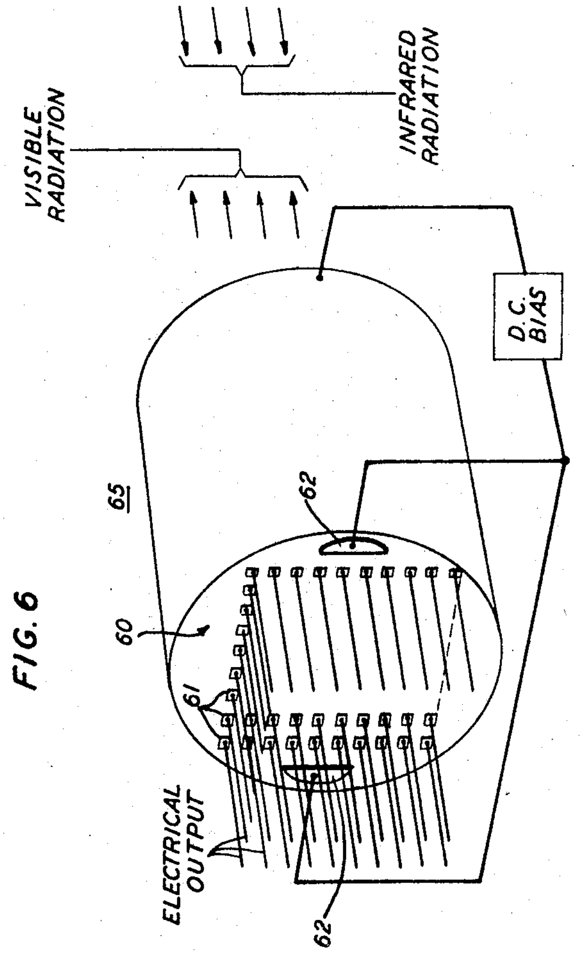
FIG. 6 illustrates an arrangement for obtaining electric signals from an image converter in accordance with the invention.

In addition to producing a visible image, the image converter can be adapted to produce an electric signal as well. This can be accomplished by locating a rectangular array of contacts 61 on the back surface 60 of a diode 65, as illustrated in FIG. 6. The D.C. bias is separately applied by means of one or more contacts 62. By controlling the spreading resistance of the back surface material, the D.C. bias can be applied to the entire diode while, at the same time, the spreading resistance would effectively isolate the individual contacts with respect to the spatially-varying and time-varying image current. The information on each of the contacts is obtained by scanning the array.

Thus, it is seen that by the selection of materials, the control of the impurity concentrations in the n-type and p-type regions, and the disposition of these regions, both the shape and the location of the avalanche region can be controlled in a manner to produce uniform emission and the desired time response. It is thus understood that the above-described arrangements are illustrative of but a small number of the many possible specific embodiments which can represent applications of the principles of the invention. For example, it will be realized that for some materials the ionization rate and the saturation velocity for holes are greater than they are for electrons. In those instances, the dual structures of those illustrated would be used wherein the avalanche region is located between the absorption region and the negative bias contact, thereby accelerating the hole type carries through the avalanche region. In all other respects, the image converter operates as described hereinabove. Thus numerous and varied other arrangements can readily be devised in accordance with these principles by those skilled in the art without departing from the spirit and scope of the invention.

We claim:

1. An infrared image converter comprising:
   a diode having a first region of p-type semiconductor material wherein the majority carriers are holes, and a second region of n-type semiconductor material wherein the majority carriers are electrons;
   said regions forming therebetween a p-n junction;
   said diode being back-biased to produce therein an avalanche region;
   and means for focusing an infrared image onto one of the surfaces of said diode;
   characterized in that an infrared image focused thereon directly produces a visible image in said diode.

2. The converter according to claim 1 wherein the avalanching process in said avalanche region is excited principally by hole type carriers.

3. The converter according to claim 1 wherein the avalanching process in said avalanche region is excited principally by electron type carriers.

4. The converter according to claim 1 wherein said avalanche region is formed with a first portion of said diode that is transparent to infrared radiation;
   and wherein a second portion of said diode is absorptive of infrared radiation.

5. The converter according to claim 1 including means for extracting a plurality of electrical signals from said diode in response to the infrared radiation focused upon said one surface of said diode.

6. The converter according to claim 5 wherein said means comprises an array of contacts disposed upon a surface of said diode opposite to said one surface.

7. The converter according to claim 1 wherein said junction is formed between regions of said diode having opposite type majority carriers in substantially equal concentrations.

8. The converter according to claim 1 wherein said junction is formed between regions of said diode having opposite type majority carriers in significantly unequal concentration.

9. The converter according to claim 1 wherein a carrier concentration in one of the regions forming said junction increases from a minimum concentration at the end of the region adjacent to said junction, to a maximum concentration at the other end of said region.

10. The converter according to claim 1 wherein the infrared radiation is focused onto one surface of said diode and the resulting visible radiation is viewed at the same surface.

11. The converter according to claim 1 wherein the infrared radiation is focused onto one surface of said diode and the resulting visible radiation is viewed at the opposite surface.

12. A diode infrared image converter comprising three successive regions of semiconductor materials;
   the first of said regions being a semiconductor material of a first conductivity type;
   the second of said regions being a semiconductor material of a second conductivity type;
   said regions forming therebetween a p-n junction;
   the third of said regions being a semiconductor material of the second conductivity type;
   said diode being back-biased to produce therein an avalanche region;
   and means for focusing an infrared image onto one of the surfaces of said diode;
   characterized in that an infrared image focused thereon directly produces a visible image in said diode.

13. The image converter according to claim 12 wherein the band gap of the semiconductor material forming said third region is less than the photon energy of said infrared wave energy; and wherein the band gap of the semiconductor material of said first and second regions is greater than the photon energy of a part of the visible spectrum.

14. The image converter according to claim 12 wherein said first region is n-type gallium phosphide; the second region is p-type gallium phosphide; and said third region is p-type gallium arsenide.

References Cited

UNITED STATES PATENTS

| | | | |
|---|---|---|---|
| 2,959,681 | 11/1960 | Noyce | 250—213 X |
| 3,059,117 | 10/1962 | Boyle et al. | |
| 3,358,146 | 12/1967 | Ing et al. | |

ARCHIE R. BORCHELT, Primary Examiner

U.S. Cl. X.R.

250—213